No. 781,011. Patented January 31, 1905.

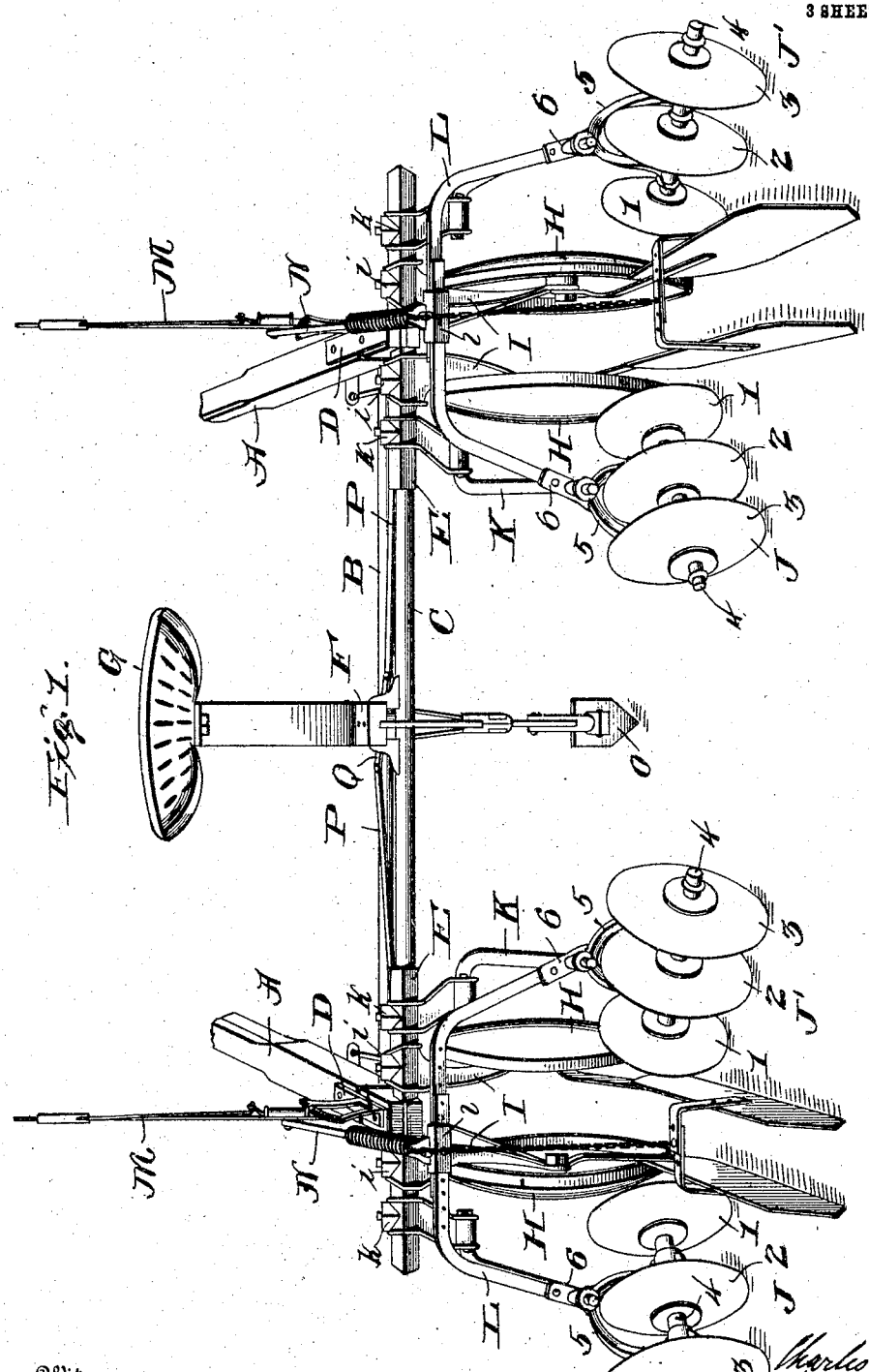

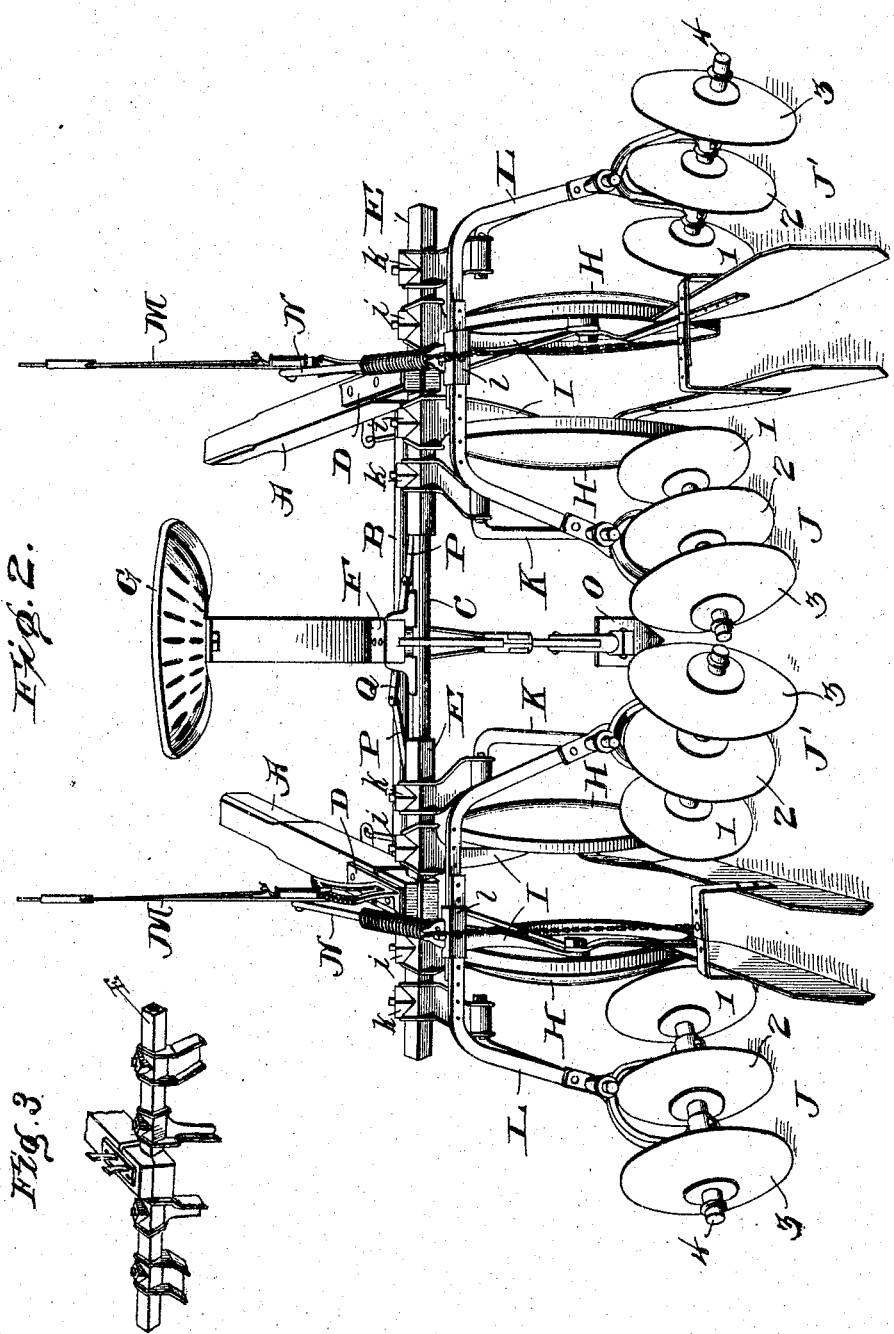

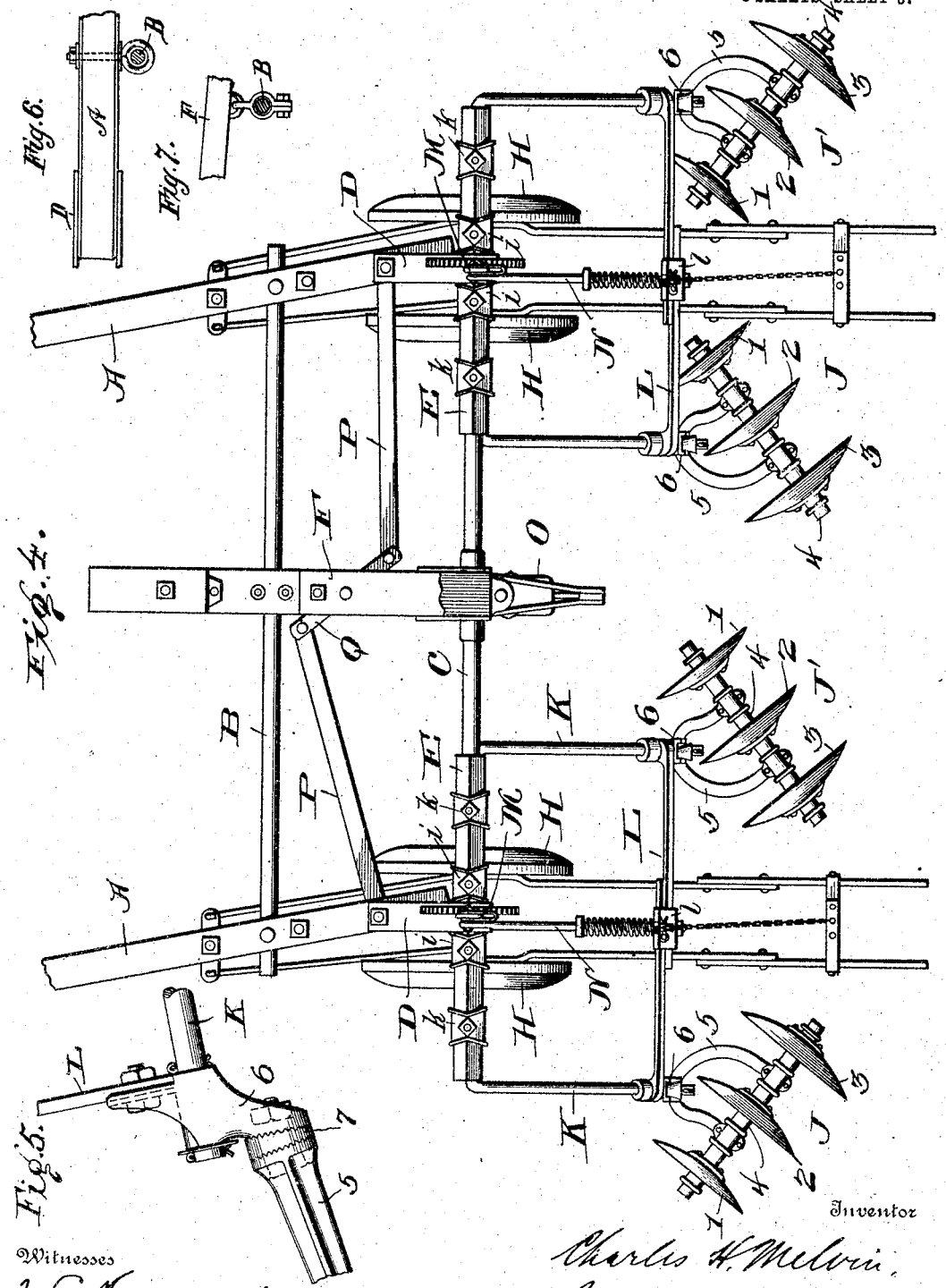

UNITED STATES PATENT OFFICE.

CHARLES H. MELVIN, OF MOLINE, ILLINOIS, ASSIGNOR TO DEERE AND COMPANY, OF MOLINE, ILLINOIS, A CORPORATION OF ILLINOIS.

LISTER-CULTIVATOR.

SPECIFICATION forming part of Letters Patent No. 781,011, dated January 31, 1905.

Application filed August 14, 1903. Serial No. 169,504.

*To all whom it may concern:*

Be it known that I, CHARLES H. MELVIN, a citizen of the United States, residing at Moline, in the county of Rock Island and State of Illinois, have invented certain new and useful Improvements in Lister-Cultivators; and I do hereby declare the following to be a full, clear, and exact description of the invention, such as will enable others skilled in the art to which it appertains to make and use the same.

My invention relates to cultivators for working listed corn or other plants, and it refers more particularly to "two-row" implements—that is, machines designed for working two rows of corn at once—embodying usually two laterally-movable or flexibly-connected frames, each formed to straddle a row and equipped with suitable cultivating devices so that the two frames and sets of cultivating devices may move toward and from each other horizontally to conform to any irregularities in the rows and consequent variations in the distance between them. Certain features of the invention, however, are equally applicable to "single-row" machines.

The principal objects of the invention are, first, to produce an efficient implement of this character especially adapted for cultivating adjacent rows and breaking up the soil between the rows whether the two sets of cultivating devices come close together or move farther apart by reason of irregularities in the rows; second, to provide a shovel or other device for cultivating or stirring up the middle ground between the rows, with means for maintaining this shovel or device midway between the two sets of cultivating devices, (however, the latter may move laterally to conform to deviations in the rows;) third, to improve the general construction of the implement, particularly with respect to the mode of connection between the two sets of cultivating devices, whereby they are allowed to move to and from each other, as aforesaid, to conform to changes in the distance between the rows, the means for adjusting the guide-wheels and cultivating devices, and the mode of connection between the draft-poles and cultivator-frames, whereby the implement may be turned to the right or left without injuring the growing crop, and, fourth, to provide an improved construction of disk gang and means for sustaining the same whereby the disks may be made to throw either in or out or cultivate toward or from the rows by a very simple adjustment.

The invention will first be described with reference to the accompanying drawings, which form a part of this specification, and its distinguishing features will then be pointed out in the claims following the description.

In said drawings, wherein corresponding parts in the different figures are designated by the same reference characters, Figure 1 is a rear view of a machine embodying my invention, showing the two sets of disk gangs separated or spread apart. Fig. 2 is a similar view showing the two sets of gangs closed up or brought together. Fig. 3 is a detail view in perspective of one of the movable sleeves E and parts rigid therewith. Fig. 4 is a top plan view of the machine with the two sets of gangs apart, showing the disks of the left set arranged to throw away from the row or furrow and those of the right set arranged to throw toward the row, also showing the draft-poles in position for turning to the left; and Fig. 5 is a detail view of the connection between the disk-gang frame and the supporting-frame which sustains it. Fig. 6 is a detail side view of the connection between the tongues and front cross-bar, and Fig. 7 is a detail side view of the connection between the front cross-bar and middle short beam.

The letters A A in the drawings refer to the tongues or draft-poles of the implement. B denotes a cross-bar or brace, which may be pivotally and slidably joined to said tongues at their rear parts, as shown in detail in Fig. 6, and C denotes a back cross-bar, also pivotally connected to their rear end portions, but not directly, the ends of the tongues being preferably bolted or pivoted to suitable devices, as in clamps D, rigid with sleeves or hollow bars E, which are slidably fitted on opposite ends of said rear cross-bar C, so as to move freely in lateral or horizontal directions.

The letter F indicates a middle short pole, which may be connected by suitable clamps or clips to the cross-bar B and the cross-bar C and on which the driver's seat G may be mounted. The connection to the front cross-bar B, however, is not absolutely rigid, for the clamp or clip which holds the pole to said cross-bar has a pendulum-like motion back and forth, as shown in detail in Fig. 7, which permits a slight backward and forward movement of the cross-bar, made necessary by the lateral movement of the poles when the horses are turned.

Each sleeve or hollow bar E, which constitutes the principal element of the corresponding cultivator-frame, is mounted on a pair of supporting and guiding disks or wheels H, which straddle one of the rows of corn, and it also sustains the set of trailing cultivating devices for the same row. In the machine illustrated the cultivating devices are in the form of disk gangs, each set comprising a gang J and a gang J', arranged obliquely and acting at opposite sides of the row. It is understood that listed corn is planted in trenches or furrows, which of course are more or less irregular. Hence any cultivator which works in listed corn must necessarily follow the furrows, in order to avoid injuring the growing crop. In machines of the present nature the guiding-disks H, which are preferably solid-faced, travel inside the furrow, and by bearing against the confronting sides or banks thereof they guide the cultivating-gangs and keep them in proper relation to the row. Thus if the two corn-rows by reason of any irregularities in the listed furrows approach or recede from each other more or less each set of guiding-disks and cultivating-gangs is free to move laterally to conform to the deviation of its particular row, the sleeves or hollow bars E sliding freely on the cross-bar C and the tongues A moving laterally with respect to the cross-bar B to correspond with the like motions of the cultivating-gangs.

The guiding-disks H are shown journaled to hangers or standards I, the upper ends of which are formed or provided with clamps or sleeves i, with binding-screws embracing and adjustably secured on the sleeves or hollow bars E, the latter being preferably square or angular in exterior formation. The said standards of the disks or furrow-wheels are shown connected by braces h with the draft-tongues. The disk gangs are shown sustained by trailing arms K, the upper forward ends of which are pivotally connected to other clamps or sleeves k with binding-screws, also adjustably secured on the square sleeves E, and said trailing arms are shown connected by an arch frame L, consisting of two flat curved bars having their lower ends suitably connected to said arms and their upper ends extending horizontally and overlapping and adjustably secured together, as by clamping-plates l and bolts. Thus the guiding-disks and the cultivating-gangs can be adjusted independently, as is frequently necessary in practice, though a construction where both the guiding-disks and the cultivating-gangs were connected to the same clamps, so as to be adjustable together, might be preferred in some cases. The trailing arms K are pivotally connected to their clamps, so as to permit said arms to swing vertically, and the cultivating-gangs can be raised and lowered by means of hand-levers M, having their fulcrums mounted on the cultivator-frames—that is, on the sleeves E or the clamps D—and connected to the clamping-plates l at the tops of the arch frames by rods or links N, said levers being provided with the usual locking devices or spring-actuated dogs engaging segmental racks affixed to the cultivator-frames, in this instance to the clamps D.

The middle beam F has a shank which carries a shovel O, which is intended to stir up the middle ground between the rows and loosen it and destroy all weeds or growth that may have sprung up in that place. Thus the ground will be thoroughly cultivated between the rows whether the two sets of cultivating devices remain close together or move apart more or less by reason of any divergence of the rows. It is desirable that whatever positions are occupied by the two sets of cultivating-gangs this shovel should always be located midway between them, or, in other words, should always travel midway between the rows, and this object should be accomplished automatically. To this end the opposite cultivator-frames may be connected by links P to the opposite extremities of a short oscillating lever or link Q, pivoted centrally to said middle beam or pole F, the inner ends of said links P being pivoted to the opposite ends of said lever Q and their outer ends being connected to the cultivator-frames—as, for example, to the bolts which pass through the clamps D and tongues A. Consequently when the two sets of gangs move toward or from each other this equalizing device throws the middle beam exactly to the center, and thus maintains the shovel midway between the rows. For example, should the right-hand gang move outward or inward by reason of any irregularity in its row the cross-axles B and C would be moved in their sleeves on the opposite or left-hand gang and tongue, so that the short middle beam F would automatically keep its place in the center between the two gangs.

It is of course much more convenient to cultivate adjacent rows with a machine of the present character than to cultivate alternate rows, and in this respect my machine is an improvement over prior implements of the same nature, which are generally constructed with the cultivating-gangs arranged to work alternate rows. If in such prior machines the cultivating-gangs were placed closer together, so as to work adjacent rows, and so disposed as to cultivate the entire middle space between the rows, then if any irregularities existed in the listed furrows the two sets of gangs would be moved either too close together, so as to conflict, or too far apart, so as not to pulverize the middle. By my construction the central stirring-blade is always kept midway between the cultivating-gangs, and thus thorough cultivation between the rows is insured.

Another important feature of my machine is the free horizontal swing of the tongues or draft-poles A. In machines where the tongues are rigid with the cultivator-frames the implement cannot be turned without throwing around the cultivating-gangs and tearing up the growing crop. In the present machine the tongues being pivoted in the clamps D are free to swing either to the right or left, and hence the implement may be turned in either direction without creating trouble.

I will now describe more particularly my improved disk gangs, which, as will be obvious, are applicable to either single-row or double-row machines. Each gang consists of a suitable number of disks, three being shown and indicated by the numerals 1, 2, and 3. These are represented, as usual, of successively different sizes, the smallest being located at the front end of the gang or foremost in the direction of the throw and the largest at the rear; but of course the disks may be of the same or any proper sizes. The disks of each gang are mounted on a shaft or axle 4, carried by a trailing or rearwardly-projecting yoke 5, which incloses the middle disk. The yoke is secured by a single longitudinally-disposed bolt and nut to its supporting arm or frame or to a suitable casting 6, to which the lower ends of both the trailing arm K and draft-arch L are secured, the construction being such that the yoke may be axially adjusted about its bolt as a center and secured in any desired position, so that the gang may be set at any inclination to conform to the incline of the furrow. For this purpose the yoke and casting 6 may be formed with confronting annular ratchet-faces around the openings for the fastening-bolt, which faces may be bolted directly together, though preferably I employ an interposed wedge-shaped ring or washer 7, having opposite corrugated or ratchet faces. The introduction of this washer permits an angular adjustment of the yoke with respect to the casting, which adds materially to the range of usefulness of the implement. In Figs. 1 and 2 and at the right of Fig. 4 the gangs are shown arranged to work toward the row or to throw the soil inward. Each gang may be reversed or turned over to an opposite oblique position, as shown at the left of Fig. 4, so as to throw outward simply by loosening the nut and turning the yoke half-way around, said yoke being suitably curved or having its arm at the rear of the middle disk longer than its other arm, as shown, in accordance with the obliquity of the shaft or axle. In either position the relation of the disks is the same, except that the whole gang is faced round about, for the middle disk is always located between the yoke-arms and the outer disks are located at the same distances at each side of the yoke. In certain prior machines the disk-shaft may be turned over end for end to reverse its obliquity; but if so reversed without further adjustment there would be a greater or lesser number of disks at each side of the disk-bearing than before. Hence in order to maintain the desired relation of the disks it is necessary to take the disks off the shaft, adjust the shaft longitudinally, and reset the disks in proper place thereon. This difficulty is obviated by my improved construction, in which it is only necessary to turn over the gang. Should it be desired to arrange the disks to throw inward and have the largest disk on the inside and the smallest disk on the outside, this may be done simply by taking off the end disks, which may be secured on the shaft or axle by appropriate means, and resetting them in interchanged positions. It is never necessary to remove the shaft nor the middle disk either for changing the order of the sizes of the disks or for reversing the obliquity and throw of the gang.

While the improved disk gangs herein described are preferably employed, it will be understood that other cultivating devices, such as blades and the like, or other forms of gangs may also be used.

Having thus fully described my invention, what I claim as new, and desire to secure by Letters Patent of the United States, is—

1. In a lister-cultivator, the combination with a cross-bar, of sleeves or hollow bars slidably fitted on opposite ends thereof, guide-wheels and cultivating devices for a row carried by each sleeve, and draft-tongues pivotally connected to said sleeves so as to swing freely horizontally.

2. In a lister-cultivator, the combination of a cross-bar, two frames each slidably secured thereto, each equipped with cultivating devices for working a row, each frame with its cultivating devices free to move transversely to conform to irregularities in its row, and draft-tongues pivotally connected to said frames to swing freely horizontally.

3. In a lister-cultivator, the combination with a cross-bar, of two frames slidable thereon, each equipped with supporting and guiding wheels and cultivating devices for working a row, tongues pivotally connected to said frames to swing horizontally, a front cross-bar pivotally and slidably connected to said tongues, an intermediate longitudinal member connected to said cross-bars, a cultivating device carried by said member, and connections between said frames and said member for maintaining the latter in central position.

4. In a lister-cultivator, the combination with a cross-bar, of a sleeve slidable thereon, a pair of guide-wheels adapted to straddle a row, and a pair of disk gangs arranged to operate at opposite sides of the row, each wheel and gang having its standard or hanger attached to a clamp adjustably secured on said sleeve, whereby both the guide-wheels and the gangs may be independently adjusted transversely with relation to each other.

5. In a lister-cultivator, the combination with a draft-frame, of a reversible disk gang comprising an oblique shaft having a number of disks mounted thereon, and a longitudinally-disposed supporting-yoke for the shaft inclosing the middle disk, said yoke being intermediately secured to the frame by a single longitudinally-disposed bolt and adjustable axially around the same to vary the inclination of the shaft.

6. In a cultivator, the combination with a draft-frame, of a trailing yoke carrying a disk-shaft, said yoke being secured to said frame by a single longitudinally-disposed fastening-bolt, annular confronting faces on the yoke and frame around said bolt, and a wedge-shaped washer interposed between said faces adapted to be set in different positions to permit an angular adjustment between said yoke and frame.

7. In a cultivator, the combination with a draft-frame of a trailing cultivator-gang-sustaining member, and a suitable supporting-bracket therefor, said member being secured to said bracket by a single longitudinally-disposed fastening-bolt and having confronting annular ratchet-surfaces, and an interposed wedge-shaped washer having opposite corresponding ratchet-surfaces.

8. In a cultivator, the combination with a draft-frame, of a reversible disk gang comprising an oblique shaft having a number of disks mounted thereon, and a trailing supporting-yoke therefor secured intermediately to said frame by a single longitudinally-disposed bolt and having unequal arms, the shorter and longer ones of which are connected respectively to forward and rearward parts of said shaft.

9. In a lister-cultivator, the combination of two flexibly-connected frames equipped with cultivating devices for working a row, tongues pivotally connected to said frames to swing horizontally, a front cross-bar pivotally and slidably connected to said tongues, an intermediate member carrying a cultivating device, and connections between said frames and said member for maintaining the latter in central position.

10. In a lister-cultivator, the combination of a main frame comprising two parallel cross-bars, two flexibly-connected and transversely-movable frames equipped with cultivating devices connected to the rear cross-bar, and tongues pivotally attached to said frames to swing horizontally and pivotally and slidably attached to the front cross-bar.

11. In a lister-cultivator, the combination of a main frame comprising two parallel cross-bars, two flexibly-connected and transversely-movable frames equipped with cultivating devices connected to the rear cross-bar, tongues pivotally attached to said frames to swing horizontally and pivotally and slidably attached to the front cross-bar, an intermediate longitudinal member connected to said cross-bars and carrying a central cultivating device, a lever centrally pivoted to said member, and links connecting the opposite ends of said lever with said flexibly-connected frames.

12. In a lister-cultivator, the combination with a rear cross-bar, of two flexibly-connected and transversely-movable frames connected thereto equipped with cultivating devices, tongues pivotally connected to said frames to swing horizontally, a front cross-bar slidably and pivotally connected to said tongues, an intermediate longitudinal member secured to said rear cross-bar and having a pendulum-like connection to the front cross-bar, and a driver's seat mounted on said intermediate member.

13. In a lister-cultivator, the combination with a rear cross-bar, of two flexibly-connected and transversely-movable frames connected thereto equipped with cultivating devices, tongues pivotally connected to said frames to swing horizontally, a front cross-bar slidably and pivotally connected to said tongues, an intermediate longitudinal member secured to said rear cross-bar and having a pendulum-like connection to the front cross-bar, and connections between said frames and said member for maintaining the latter in medial position.

14. In a lister-cultivator, the combination of a pair of flexibly-connected frames adapted to move transversely to conform to irregularities in the rows, each equipped with cultivating devices for working a row, draft-tongues pivotally connected to said frames to swing freely horizontally, and a brace slidably and pivotally connected to said draft-tongues.

In testimony whereof I affix my signature in presence of two witnesses.

CHARLES H. MELVIN.

Witnesses:
   CHAS. H. POPE,
   SCHILLER HOSFORD.